(12) United States Patent
Papple et al.

(10) Patent No.: US 10,989,409 B2
(45) Date of Patent: Apr. 27, 2021

(54) COMBUSTOR HEAT SHIELD

(71) Applicant: PRATT & WHITNEY CANADA CORP., Longueuil (CA)

(72) Inventors: Michael Papple, Verdun (CA); Robert Sze, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/299,386

(22) Filed: Mar. 12, 2019

(65) Prior Publication Data

US 2019/0212008 A1   Jul. 11, 2019

Related U.S. Application Data

(62) Division of application No. 14/684,792, filed on Apr. 13, 2015, now Pat. No. 10,267,521.

(51) Int. Cl.
| | |
|---|---|
| *F23R 3/00* | (2006.01) |
| *F23R 3/04* | (2006.01) |
| *F23R 3/10* | (2006.01) |

(52) U.S. Cl.
CPC .............. *F23R 3/005* (2013.01); *F23R 3/002* (2013.01); *F23R 3/04* (2013.01); *F23R 3/10* (2013.01); *F05D 2260/20* (2013.01); *F23R 2900/03041* (2013.01); *F23R 2900/03042* (2013.01); *F23R 2900/03044* (2013.01)

(58) Field of Classification Search
None
See application file for complete search history.

(56) References Cited

U.S. PATENT DOCUMENTS

| | | | | |
|---|---|---|---|---|
| 5,154,060 A | * | 10/1992 | Walker | F23R 3/60 60/746 |
| 5,396,759 A | * | 3/1995 | Richardson | F23R 3/10 60/804 |
| 5,435,139 A | * | 7/1995 | Pidcock | F23R 3/002 60/752 |
| 5,479,774 A | | 1/1996 | Burnell | |
| 5,542,246 A | | 8/1996 | Johnson | |
| 5,623,827 A | | 4/1997 | Monty | |
| 5,687,572 A | | 11/1997 | Schrantz | |
| 5,737,922 A | * | 4/1998 | Schoenman | F23R 3/005 60/752 |
| 5,758,503 A | | 6/1998 | DuBell et al. | |
| 5,799,491 A | * | 9/1998 | Bell | F23R 3/002 60/752 |
| 5,894,732 A | | 4/1999 | Kwan | |
| 6,032,457 A | | 3/2000 | McKinney et al. | |
| 6,735,950 B1 | | 5/2004 | Howell et al. | |

(Continued)

*Primary Examiner* — Gerald L Sung
*Assistant Examiner* — Marc J Amar
(74) *Attorney, Agent, or Firm* — Norton Rose Fulbright Canada LLP

(57) ABSTRACT

A gas turbine engine combustor has a dome and a shell extending axially from the dome. The dome and the shell cooperates to define a combustion chamber. A dome heat shield is mounted to the dome inside the combustion chamber. A front heat shield is mounted to the shell inside the combustion chamber. The dome heat shield and the front heat shield have axially overlapping portions cooperating to define a flow guiding channel. The flow guiding channel has a length (L) and a height (h). The length (L) is at least equal to the height (h).

7 Claims, 5 Drawing Sheets

(56) References Cited

U.S. PATENT DOCUMENTS

| | | | |
|---|---|---|---|
| 7,328,582 B2 | 2/2008 | Sandelis et al. | |
| 7,363,763 B2 | 4/2008 | Coughlan | |
| 7,631,503 B2 | 12/2009 | Stastny | |
| 7,690,207 B2 | 4/2010 | Markarian | |
| 7,726,131 B2 | 6/2010 | Sze | |
| 8,266,914 B2 | 9/2012 | Hawie | |
| 8,938,970 B2 | 1/2015 | Gerendas et al. | |
| 9,423,129 B2 | 8/2016 | Graves | |
| 10,012,390 B2 | 7/2018 | Bake | |
| 2005/0050896 A1* | 3/2005 | McMasters | F23M 5/085 60/748 |
| 2005/0086940 A1 | 4/2005 | Coughlan | |
| 2006/0005543 A1 | 1/2006 | Burd | |
| 2006/0042257 A1 | 3/2006 | Stastny | |
| 2008/0016874 A1 | 1/2008 | Markarian | |
| 2008/0104962 A1 | 5/2008 | Patel et al. | |
| 2008/0178599 A1 | 7/2008 | Hawie | |
| 2008/0264064 A1 | 10/2008 | Sze | |
| 2009/0308077 A1 | 12/2009 | Shelley | |
| 2010/0050650 A1* | 3/2010 | Patel | F02C 3/145 60/754 |
| 2011/0185739 A1 | 8/2011 | Bronson et al. | |
| 2011/0197590 A1 | 8/2011 | Bottcher et al. | |
| 2013/0055722 A1 | 3/2013 | Verhiel | |
| 2013/0247575 A1* | 9/2013 | Patel | F23R 3/10 60/752 |
| 2013/0255269 A1 | 10/2013 | McKenzie | |
| 2014/0250917 A1* | 9/2014 | Garry | B22D 25/02 60/806 |
| 2015/0059349 A1* | 3/2015 | Patel | F23R 3/002 60/772 |
| 2015/0128603 A1* | 5/2015 | Clemen | F23R 3/04 60/758 |
| 2015/0135720 A1* | 5/2015 | Papple | F23R 3/60 60/759 |
| 2015/0260404 A1* | 9/2015 | Sullivan | F23R 3/10 60/754 |
| 2015/0345789 A1 | 12/2015 | Papple | |
| 2015/0362191 A1 | 12/2015 | Papple | |
| 2016/0010869 A1 | 1/2016 | Bake | |
| 2016/0040880 A1 | 2/2016 | Sreekanth | |
| 2016/0178198 A1* | 6/2016 | Gerendas | F23R 3/04 60/753 |
| 2016/0313005 A1 | 10/2016 | Chang | |
| 2017/0276356 A1 | 9/2017 | Mulcaire | |
| 2018/0073736 A1* | 3/2018 | Papple | F23R 3/10 |

* cited by examiner

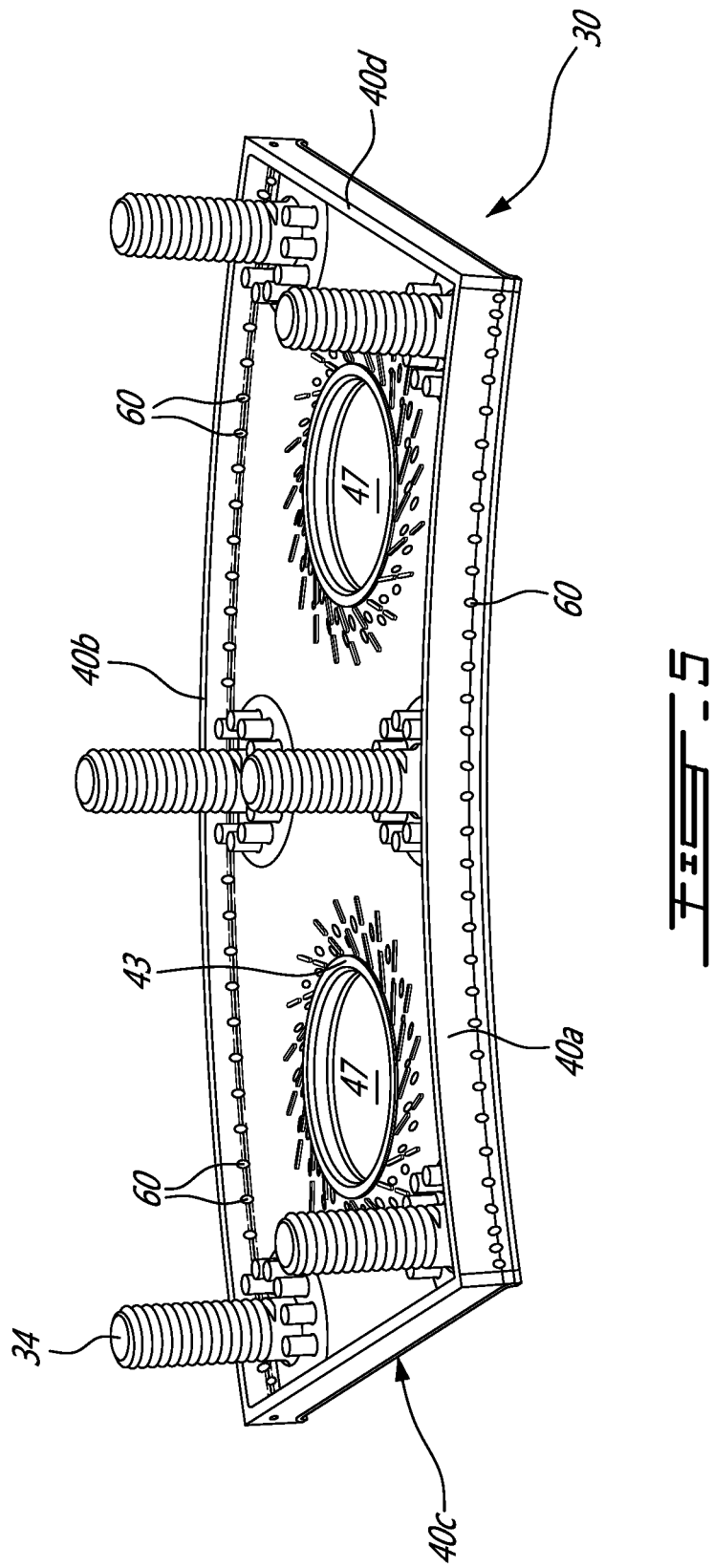

COMBUSTOR HEAT SHIELD

CROSS-REFERENCE TO RELATED APPLICATIONS

This application is a divisional of U.S. patent application Ser. No. 14/684,792 filed Apr. 13, 2015, the entire contents of which are incorporated by reference herein.

TECHNICAL FIELD

The application relates generally to gas turbine engines and, more particularly, to combustor heat shields.

BACKGROUND OF THE ART

Heat shields such as those used to protect the combustor shells, are exposed to hot gases in the primary combustion zone. The amount of coolant available for cooling the heat shields must be minimized to improve the combustion efficiency and to reduce smoke, unburned hydrocarbon and CO/NOx emission.

There is a continuing need for improved heat shields and targeted cooling schemes.

SUMMARY

In one aspect, there is provided a gas turbine engine combustor comprising: a dome, a shell extending axially from the dome, the dome and the shell cooperating to define a combustion chamber, a dome heat shield mounted to the dome inside the combustion chamber, a front heat shield mounted to the shell inside the combustion chamber, the dome heat shield and the front heat shield having axially overlapping portions cooperating to define a flow guiding channel, the flow guiding channel having a length (L) and a height (h), the length (L) being at least equal to the height (h).

In a second aspect, there is provided a gas turbine engine combustor having an annular dome; inner and outer shells extending generally axially from the annular dome, the annular dome and the inner and outer shells defining a combustion chamber; a dome heat shield mounted to the annular dome inside the combustion chamber, the dome heat shield having a back face facing the annular dome and an opposed front face facing the combustion chamber, the dome heat shield further having radially inner and radially outer periphery rails projecting from the back face thereof, the radially inner and outer periphery rails extending respectively along radially inner and outer edges of the dome heat shield; and inner and outer front heat shields respectively mounted to the inner and outer shells, the inner and outer front heat shields having respective upstream end portions extending in overlapping relationship with the radially inner and outer periphery rails of the dome heat shield so as to define an inner flow guiding channel and an outer flow guiding channel in a region upstream from the front face of the dome heat shield relative to a flow of gases through the combustion chamber.

In a third aspect there is provided a method of forming a flow guiding channel between a dome heat shield adapted to be mounted to a dome of a gas turbine engine combustor and a front heat shield adapted to be mounted to a shell of the gas turbine engine combustor adjacent to the dome heat shield, the method comprising: positioning the front heat shield so that an upstream end portion thereof axially overlaps an adjacent peripheral surface of the dome heat shield, the adjacent peripheral surface extending rearwardly from a front gas-path face of the dome heat shield and being radially spaced from the upstream end portion of the front heat shield to form therewith a flow guiding channel in a region of the combustor upstream of the front gas-path face of the dome heat shield, the relative positioning of the front heat shield and the dome heat shield being selected so that a length (L) of the flow guiding channel be equal to or greater than a height (h) of the channel.

DESCRIPTION OF THE DRAWINGS

Reference is now made to the accompanying figures, in which:

FIG. 5 is an isometric back view of an example of a combustor dome heat shield.

DETAILED DESCRIPTION

Figure 1:
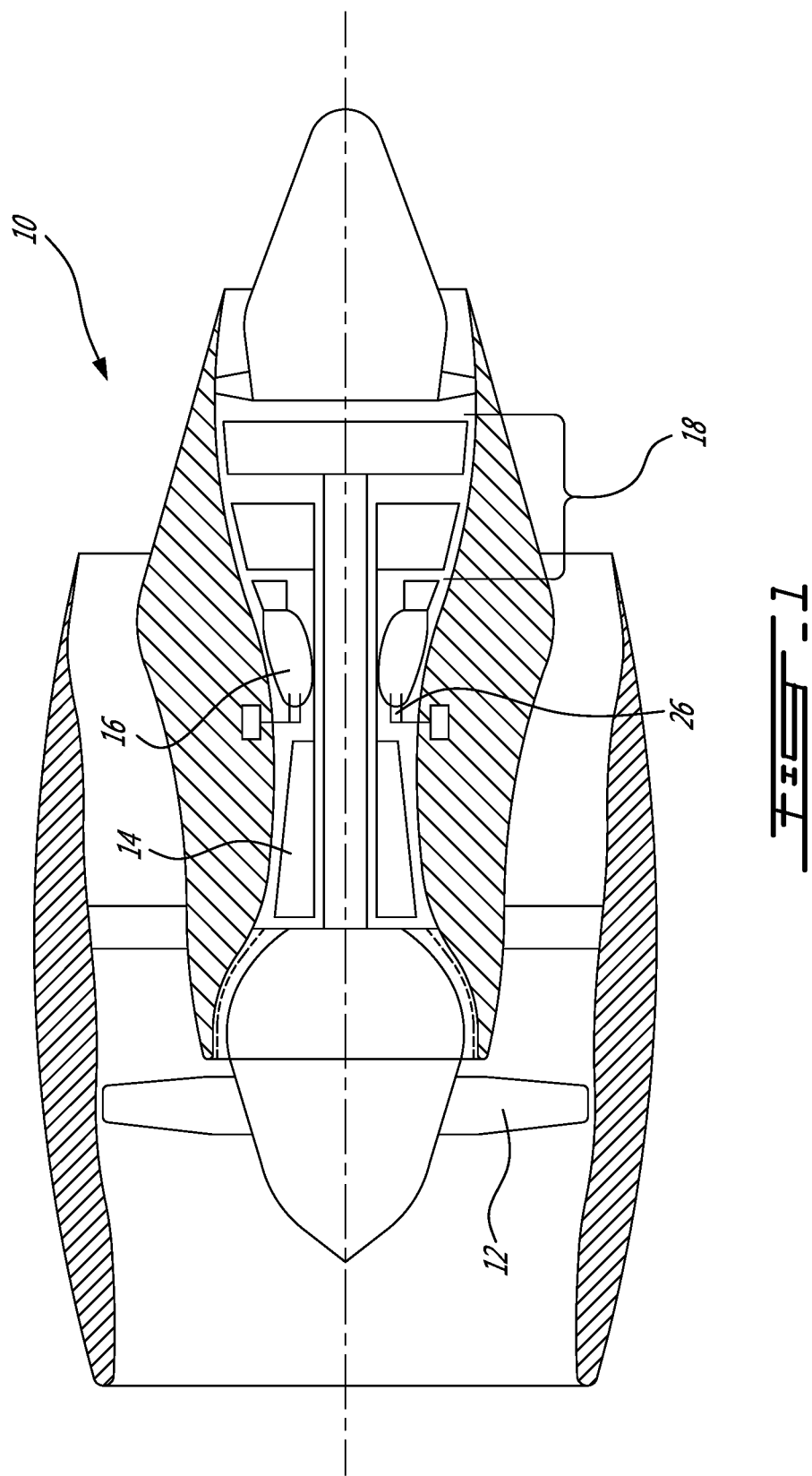
FIG. 1 is a schematic, cross-sectional view of a turbofan engine having a straight flow annular combustor.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
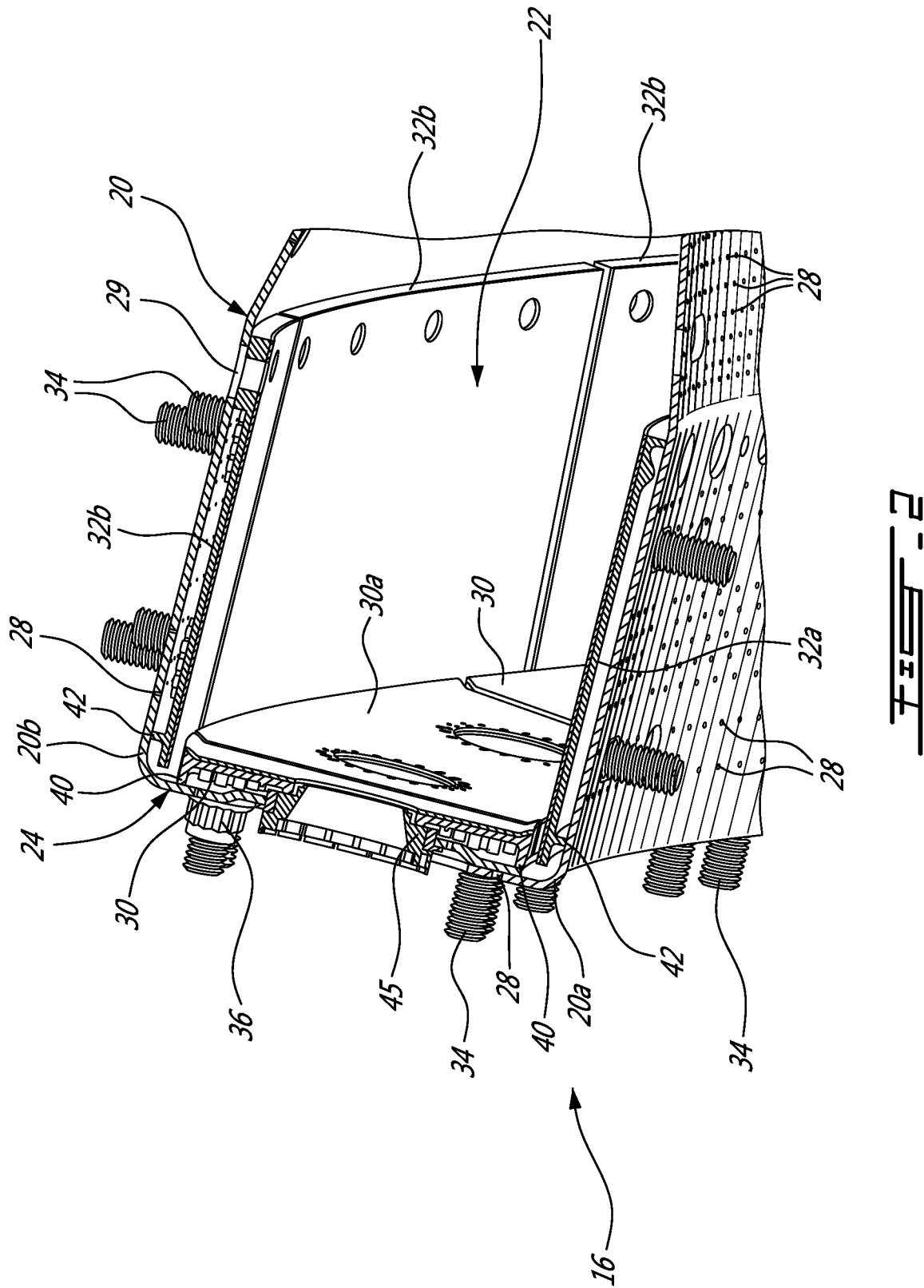
FIG. 2 is an isometric view of an inlet end portion of the combustor of the engine shown in FIG. 1.

The combustor 16 is housed in a plenum supplied with compressed air from compressor 14. As shown in FIG. 2, the combustor 16 comprises an annular combustor shell 20 including a radially inner shell 20a and a radially outer shell 20b, defining a combustion chamber 22 therebetween. The radially inner and outer shells 20a, 20b have radially extending end portions which radially overlap to form an inlet dome 24 at an upstream end of the combustor 16. As shown in FIG. 1, a plurality of fuel nozzles 26 are mounted to extend through the dome 24 of the combustor 20 to deliver a fuel-air mixture to the combustion chamber 22.

The radially inner and outer shells 20a, 20b extend generally axially downstream from the dome 24 to an exit portion or outlet (not shown) formed at a downstream end of the combustor 16 for communicating combustion gases to the turbine section 18.

A plurality of impingement holes 28 (FIGS. 2-4) may be defined in the radial and axial portions of the inner and outer shells 20a and 20b for cooling purposes, and dilution holes 29 (FIG. 2) may also be provided in the axial portion downstream of the fuel nozzles 26 for combustion purposes. It is understood that the inner and outer shells 20a and 20b may have any suitable configuration. The inner and outer shells 20a and 20b are typically made out of sheet metal, though any suitable material(s) and manufacturing method(s) may be used.

Referring to FIG. 2, it can be appreciated that circumferentially distributed dome heat shields 30 (only two being partly shown in FIG. 2) are mounted to the dome 24, inside the combustion chamber 22, to protect the dome 24 from the high temperatures in the combustion chamber 22. Likewise, circumferentially distributed radially inner and outer front heat shields 32a, 32b are respectively mounted to the axial portion of the inner and outer shells 20a, 20b immediately downstream from the dome 24. The dome heat shields 30 and the front heat shields 32a, 32b are typically castings made out of high temperature capable materials. Each heat shield has a heat shield body typically provided in the form of a circular sector. As shown in FIG. 2, a plurality of threaded studs 34 extends from a back face of the heat shield bodies and through corresponding mounting holes (not shown) defined in the inner and outer shells 20a, 20b. Self-locking nuts 36 are threadably engaged on the studs 34 from outside of the combustion chamber 22 for holding the heat shields 30, 32a, 32b tightly against the combustor shell 20.

Figure 3:
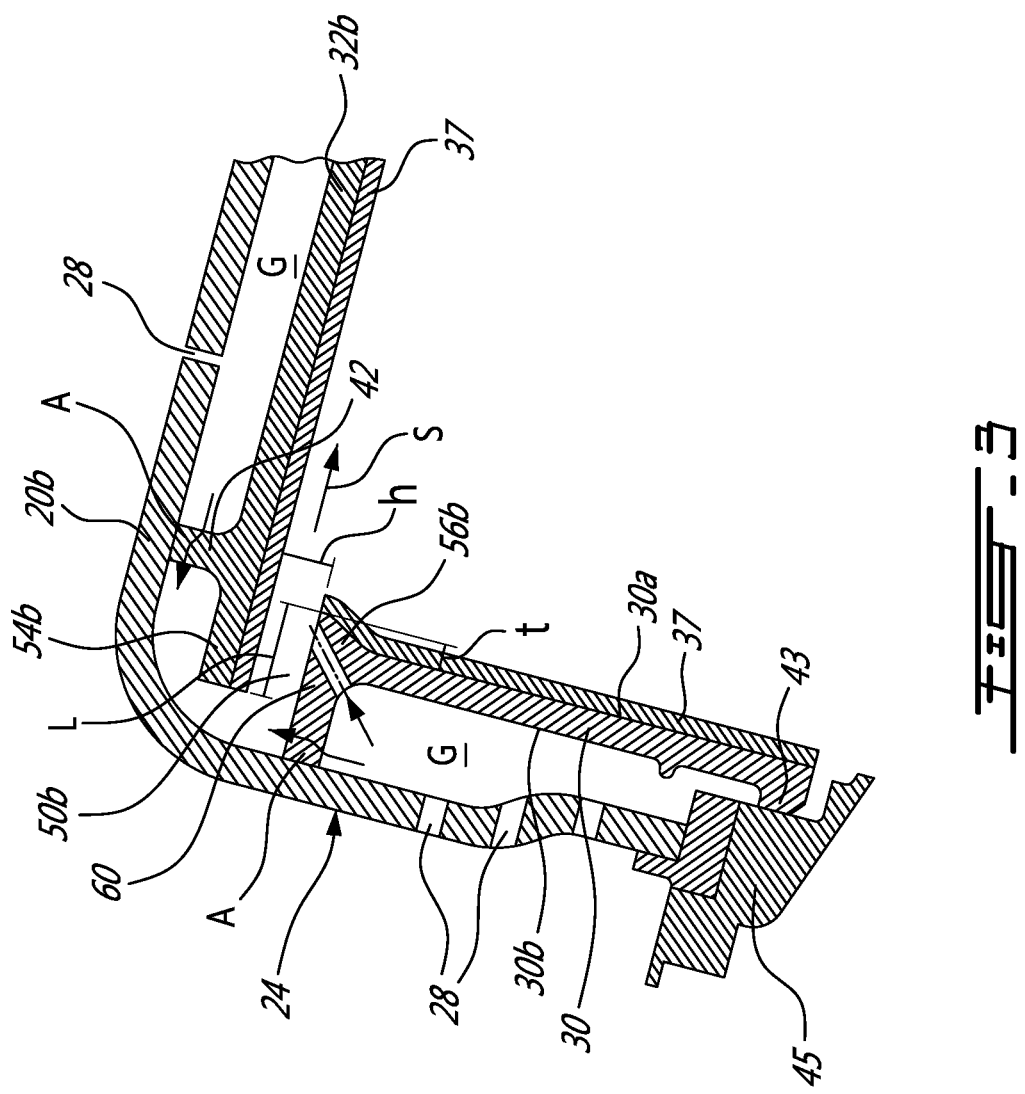
FIG. 3 is an enlarged, fragmentary cross-section view of the inlet end portion of the combustor shown in FIG. 2 and illustrating an outer flow guiding channel between a dome heat shield and a radially outer front heat shield.
Figure 4:
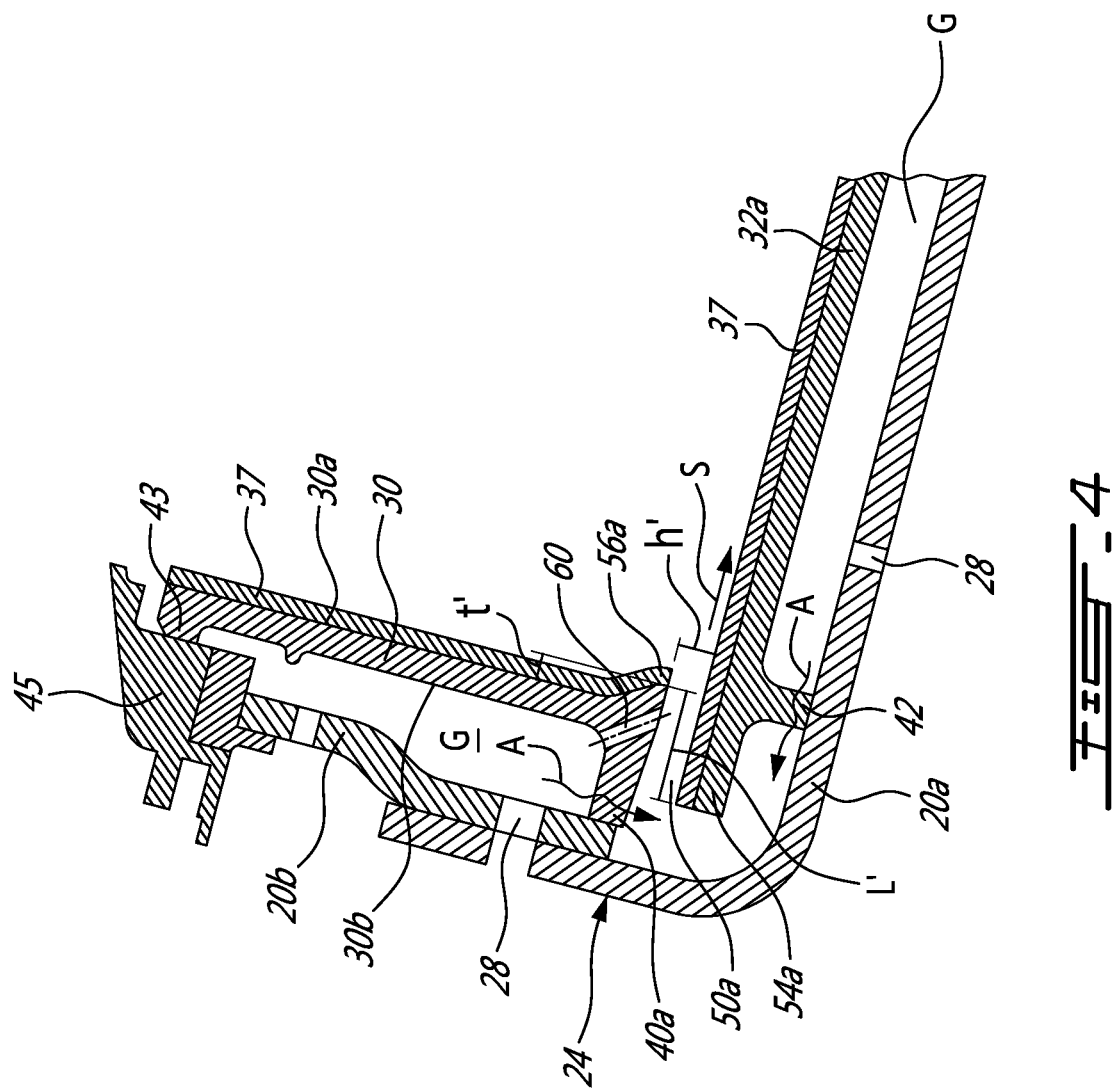
FIG. 4 is an enlarged, fragmentary cross-section view of the inlet end portion of the combustor shown in FIG. 2 and illustrating an inner flow guiding channel between a dome heat shield and a radially inner front heat shield.

Referring to FIGS. 2-4, the back face of each heat shield (i.e. the side facing the combustor shell) is the cool side of the heat shield, while the opposed front face is the hot or gas-path side, facing the combustion chamber 22. The heat shields 30, 32a, 32b are coated on their front face. The coating is typically a thermal barrier coating 37 (FIGS. 3 and 4). The heat shields 30, 32a and 32b are spaced from the combustor shell 20 so that the back face defines a cooling air space or gap G. As can be appreciated from FIGS. 2-4, rails extend from the back face of each heat shield body across the cooling air gap and into sealing engagement with the combustor shell 20, thereby compartmentalizing the cooling air gap G and directing the cooling air as suited towards targeted areas. More particularly, referring concurrently to FIGS. 2 to 5, each dome heat shield 30 may be provided with periphery rails 40a, 40b, 40c and 40d along the radially inner and outer edges as well as along the opposed side edges thereof, the periphery rails defining a closed perimeter at the back of the dome heat shield 30. The front inner and outer heat shield 32a, 32b may also be provided with periphery rails 42 at the upstream and downstream ends thereof. Nozzle opening bosses 43 may also project from the back face 30b of the dome heat shields 30 around each fuel nozzle opening 47 (FIG. 5) for sealing engagement with an adjacent part of the combustor, such as a swirler 45 (FIGS. 3 and 4).

In practice, the contact between the periphery rails 40, 42 of the heat shields 30, 32a, 32b and the combustor shell 20 is not perfect and coolant in gap G can leak across the top of the periphery rails 40, 42 as schematically depicted by arrows A in FIGS. 3 and 4. It is herein suggested to use this periphery rail leakage to form a starter film over the hot front face of the inner and outer front heat shields 32a, 32b. The starter film S helps cooling the inner and outer front heat shields 32a, 32b. Since the starter film S is spent flow from the dome heat shield 30 and the front heat shields 32a, 32b, there is no additional compromise to the engine.

Applicant has found that the quality of the starter film S can be improved by properly guiding the incoming flow of spent coolant over the front face of the inner and outer front heat shields 32a, 32b. In that regard, it is herein proposed to form flow guiding channels 50a and 50b between the dome heat shields 30 and the inner and outer front heat shields 32a and 32b, respectively. Indeed, the channels 50a and 50b may help reducing the magnitude of the coolant flow disturbances and, thus, provide for a better starter film quality. The length L, L' of the channels 50a and 50b in a generally axial direction should be generally greater than their height h, h' in a generally radial direction. In other words, the ratios L/h and L'/h' of channels 50a, 50b should be equal to or greater than 1.

As shown in FIG. 3 with respect to radially outer channel 50b, this may be achieved by increasing the length of an upstream end portion or lip 54b of the outer front heat shields 32b in the upstream direction so as to axially overlap the radially outer periphery rail 40b of the combustor dome heat shields 30. Likewise, the length of the upstream end portion 54a of the inner front heat shields 32a may be increased or positioned to axially overlap the radially inner periphery rail 40a of the combustor dome heat shields 30, as shown in FIG. 4. As shown in FIGS. 3 and 4, the length L and L' of the inner and outer channels 50a, 50b may be completed by an axially forward overlap between the inner and outer front heat shields 32a, 32b and inner and outer lips 56a, 56b projecting forwardly from the front face 30a of the dome heat shields 30 along the radially inner and outer edges thereof in alignment with the inner and outer periphery rails 40a, 40b. However, the length t and t' of the inner and outer lips 56a, 56b (the distance by which the lips protrude from the front face of the heat shields into the combustion chamber 22) of the combustor dome heat shields 30 should be minimized to avoid overheating problems. Indeed, if the dome heat shield lips 56a, 56b extend too far into the combustion chamber 22, they will be exposed to very high temperatures and, thus, they may eventually overheat and burn out. That is the durability of the lips is better if the lips are shorter. Forming a major portion of the channels 50a, 50b in an upstream region behind the front face 30a of the dome heat shields 30 allows to reduce the distance by which the lips 56a, 56b must protrude into the combustion chamber 22 and, thus, reduce the likelihood of lip overheating problems while still providing a sufficient flow guiding length L, L' for ensuring the quality of the starter film S. It can be appreciated from FIGS. 3 and 4 that a major portion of the length L, L' of channels 50a, 50b is disposed upstream of the front face 30a of the dome heat shields 30 (i.e. a major portion of the channel length L, L' is formed between the inner and outer periphery rails 40a, 40b of the dome heat shields 30 and the upstream lips 54a, 54b of the inner and outer front heat shields 32a, 32b).

It can also be appreciated from FIG. 3 that the radially outer lip 56b and the radially outer periphery rail 40b of the dome heat shields 30 form a smooth and axially continuous flow guiding surface. Likewise, the radially inner lip 56a and the radially inner periphery rail 40a of the dome heat shields 30 form a smooth and axially continuous flow guiding surface, as shown in FIG. 4. These inner and outer flow guiding surfaces are respectively generally parallel to the hot front surface or gas-path side surface of the radially inner and outer front heat shields 32a, 32b.

As shown in FIGS. 3 to 5, periphery rail holes 60 may be defined along the radially inner and outer periphery rails 40a, 40b of the dome heat shields 30. The periphery rail holes 60 extend through the rails 40a, 40b at the root or base of the inner and outer lips 56a, 56b, thereby allowing the lips 56a, 56b to be cooled by convection. The periphery air holes 60 have an inlet end which is in fluid flow communication with the cooling air gap G behind the dome heat shields 30 and an opposed outlet end which opens into respective channels 50a, 50b. Accordingly, a portion of the cooling air or coolant in the gap G behind the dome heat shields 30 will flow through the periphery rail holes 60 into the channels 50a, 50b to combine with the periphery rail leakage A to form the starter film S over the front heat shields 32a, 32b. As can be appreciated from FIGS. 3 and 4, the periphery rail holes may be laser drilled or otherwise formed at an angle so as to have axial and radial components. The holes 60 are angled so as to have a forward axial component to provide better cooling of the forwardly projecting combustor dome heat shield lips 56a, 56b.

In operation, cooling air in the plenum surrounding the combustor 16 will flow through impingement holes 28 defined in the inner and outer shells 20a, 20b and impinge against the back face of the dome heat shields 30 and the front heat shields 32a, 32b. After impinging upon the heat shields, a first portion of the cooling air will flow through effusion holes (not shown) defined through the heat shields 30, 32a, 32b. A second portion of the spent air will leak over the periphery rails 40a, 40b and 42 into the inner and outer flow guiding channels 50a, 50b. The remainder of the coolant will flow through the periphery rail holes 60 to cool down the heat shield lips 56a, 56b. The air flowing through the periphery air holes 60 will combine with the periphery rail leakage A to form a starter film on the front or upstream portion of the inner and outer front heat shields 32a, 32b. The combined flow of periphery rail leakage and periphery rail hole flow is guided along the channels 50a, 50b, thereby minimizing flow disturbances and, thus, providing for the formation of a good quality starter film S.

The above description is meant to be exemplary only, and one skilled in the art will recognize that changes may be made to the embodiments described without departing from the scope of the invention disclosed. For example, the invention can be provided in any suitable heat shield configuration and in any suitable combustor configuration, and is not limited to application in turbofan engines. Still other modifications which fall within the scope of the present invention will be apparent to those skilled in the art, in light of a review of this disclosure, and such modifications are intended to fall within the appended claims.

What is claim is:

1. A method of forming a flow guiding channel between a dome heat shield adapted to be mounted to a dome of a gas turbine engine combustor and a front heat shield adapted to be mounted to a shell of the gas turbine engine combustor adjacent to the dome heat shield, the gas turbine engine combustor having an axis, the method comprising: positioning the front heat shield so that an upstream end portion thereof axially overlaps an adjacent peripheral surface of the dome heat shield, the adjacent peripheral surface including a periphery rail extending rearwardly from a back face of the dome heat shield opposite to a front gas-path face thereof and being radially spaced from the upstream end portion of the front heat shield to form therewith the flow guiding channel in a region of the combustor upstream of the front gas-path face of the dome heat shield, the periphery rail extending in continuity to a lip extending from the front gas-path face, the relative positioning of the front heat shield and the dome heat shield being selected so that a length (L) of the flow guiding channel be equal to or greater than a height (h) of the flow guiding channel, the method further comprising defining at least one hole through the periphery rail of the dome heat shield at a root of the lip, the at least one hole being angled so as to have a radially outer component and an axial forward component in a direction away from the dome, the at least one hole having an outlet fluidly connected to the flow guiding channel.

2. The method of claim 1, wherein the lip overlaps the front heat shield along a length (t), the length (t) is less than a length of the overlap between the front heat shield and the adjacent peripheral surface extending rearwardly from the front gas-path face of the dome heat shield.

3. The method of claim 1, comprising configuring the flow guiding channel to, in use, receive cooling air leaking between the periphery rail of the dome heat shield and the dome of the gas turbine engine combustor.

4. The method of claim 3, wherein configuring the flow guiding channel further comprises fluidly connecting the flow guiding channel to a cooling air gap between the shell and the front heat shield.

5. The method of claim 1, comprising fluidly connecting an inlet of the at least one hole with a cooling air gap between the dome heat shield and the dome of the gas turbine engine combustor.

6. The method of claim 1, wherein the flow guiding channel is formed so that a major portion of the length (L) is disposed rearward of the front gas-path face of the dome heat shield.

7. The method of claim 1, wherein the at least one hole is positioned to, in use, provide convection cooling to the lip as cooling air flows through the at least one hole.

* * * * *